United States Patent Office.

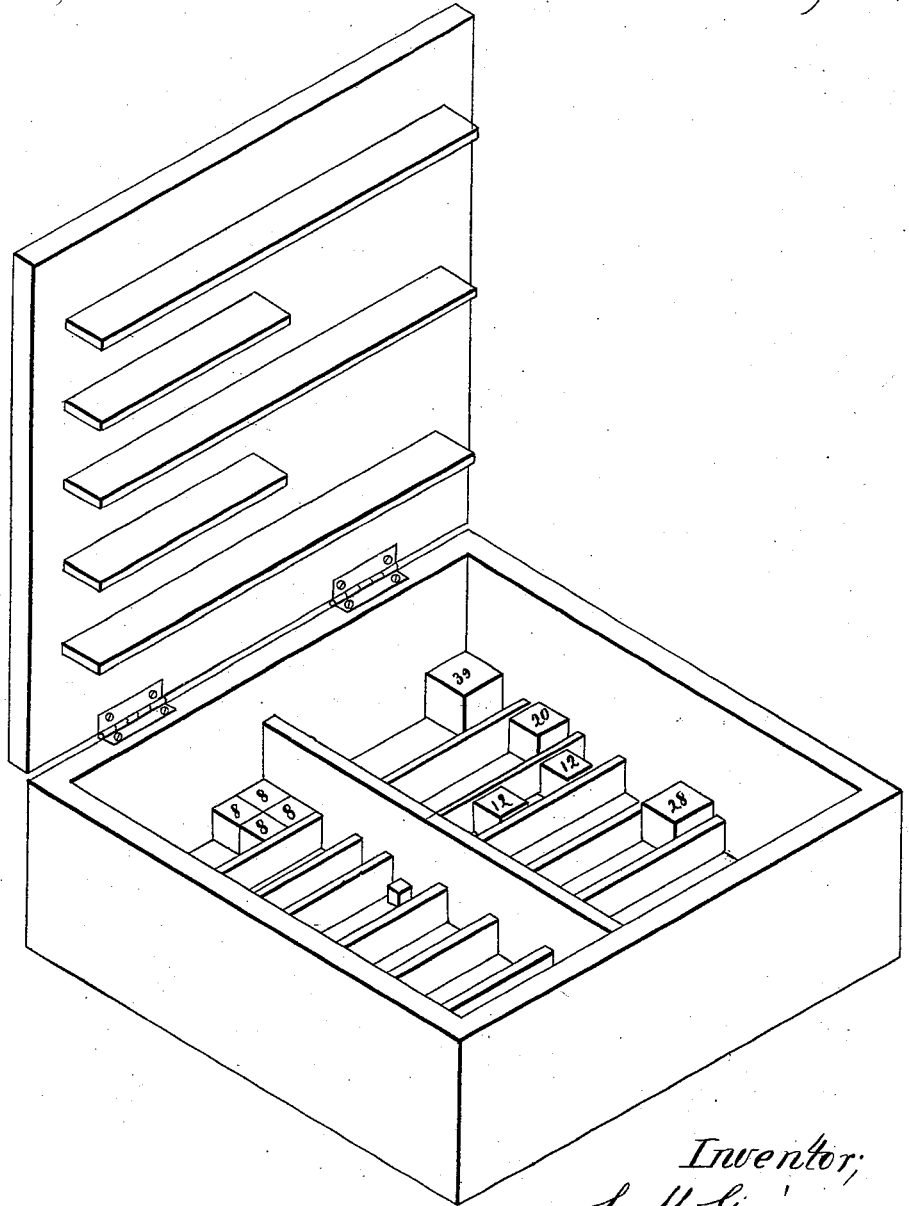

SAMUEL M. GAINES, OF GLASGOW, KENTUCKY.

*Letters Patent No. 85,299, dated December 29, 1868.*

METHOD OF TEACHING THE RUDIMENTS OF CHEMISTRY.

The Schedule referred to in these Letters Patent and making part of the same.

*To all whom it may concern:*

Be it known that I, SAMUEL M. GAINES, of Glasgow, in the county of Barren, and State of Kentucky, have invented a new and useful Improvement in the Art of Teaching the Rudiments of Chemistry; and I do hereby declare that the following is a full, clear, and exact description thereof, reference being had to the accompanying drawings, and to the letters of reference marked thereon.

The great difficulty which has been hitherto experienced in teaching the rudiments of chemistry, has been the absence of any simple and easy method of illustration, which can be used at every recitation, and by which the attention of a class can be secured, and the elementary truths of the science fixed in the memory.

The system introduced by Berzelius, of illustrating chemical compositions and reactions to the eye, by means of symbols and equations, though of great service to the chemist, is liable to the objection of being too abstract for beginners.

The recognition of this fact led to the invention of the "chemical chart," by Dr. Youmans, which, though a great help to both teacher and pupil, is sadly deficient, since, from the nature of the case, his pictures of combinations are fixed, and require no effort on the part of the pupil, he being, on this plan, relieved from the trouble of forming the compounds himself, the very thing which, above all others, is necessary to make a lasting impression.

To remedy these defects, and meet the wants of the teacher, I have invented the chemical alphabet herein described, which I have proved, in the school-room, to be far more efficient than any method heretofore used for illustrating this subject.

I represent the atoms, or simple elementary bodies, by cubes, taking hydrogen for the base. These cubes may, of course, be made of any size; but I prefer to make the cubes representing hydrogen about one-fourth of an inch square, and I mark upon each face the figure 1, without any symbol, so that, in the mind of the pupil, the number alone may always represent hydrogen.

The cubes representing carbon, I make six times larger than those representing hydrogen, to indicate to the eye that it is six times heavier, and I place the figure 6 on each face.

Oxygen is represented by cubes made eight times larger than hydrogen, and so on with all the other elements, each being represented by cubes of proper proportions, relatively to hydrogen.

Each cube may have a color representing some property of the matter for which it is used, as, for example, oxygen may be red, and carbon, black, &c.

For convenience in teaching, I provide a box, the bottom of which is divided, by means of strips or cleats, into as many separate apartments as there are different varieties of cubes to be used in teaching.

The lid of this box is provided with suitable stays, to hold it in a vertical position when open, and its inner side is provided with a series of shelves, on which the cubes may be placed, to represent chemical combinations.

The accompanying drawing represents the box which I use, with its lid raised to a vertical position.

A is the bottom of the box, divided into apartments by cleats, *a*, and

B is the lid, provided with shelves *b*.

The cubes are indicated by the letter *c*.

Analysis has been able to discover, in all the domain of nature, but from sixty-two to sixty-four simple bodies, and of these, from ten to fifteen only are concerned in the formation of the greater part of the familiar objects we see around us.

In order, therefore, not to confuse the mind of the student unnecessarily, I limit myself to these fifteen elements, which can be readily learned, and, by the aid of which, the pupil is soon able to form any compound as readily as he can spell any word by the use of the English alphabet.

To illustrate the method of using this chemical alphabet, one example will suffice. The pupils will very soon learn the alphabet so thoroughly that they will instantly recognize each of the fifteen elements on seeing its combining-number.

Now, if a class thus instructed be at the recitation-bench, and one of them is requested to form carbonic acid, he will walk quickly to the table in front, where the box is open, and place on one of the shelves a cube marked 6, and two marked 8—carbon, one, and oxygen, two. If requested to form lime, he will place on the shelf a cube marked 20, (calcium,) and another marked 8, (oxygen,) these being the elements of lime. These cubes being all placed in contact, and the pupil being asked, "What have we now?" answers, "Carbonate of lime."

Another pupil may then be asked to give the proximate analysis of carbonate of lime, and the cubes before him will indicate the answer and fix it in his memory: "It is composed of one equivalent of carbonic acid, (22) and one of lime, (28)." Another may be requested to give the ultimate analysis, and by the same means he is furnished with the answer: "Carbonic acid is composed of one atom of carbon and two of oxygen, and the lime is composed of one atom of calcium and one of oxygen."

Thus it will be seen that by means of the "chemical alphabet," definitions may be instantly formed, which it would require many words, and even sentences, to express in written language; and the definitions thus formed by the use of the cubes will be much more intelligible to the pupil, and will make a more lasting impression upon his memory than any mere form of words, written or spoken, could possibly do.

The intelligent educator will see at a glance, that in this chemical alphabet he has the means of at once arresting the attention of his class, and converting what has hitherto been an irksome task into a pleasant recreation. The atomic theory, the characteristics of affinity, the law of multiple proportions, the nomenclature, isomerism, &c., may all be learned in half the time required heretofore, and learned so as not likely ever to be forgotten.

Having thus fully described my invention, and the mode of carrying it into effect,

What I claim as new, and desire to secure by Letters Patent, is—

1. The method of teaching the rudiments of chemistry by means of movable material bodies, varying in size, and marked with numbers, so as to represent the relative weight of the ultimate particles of matter of different chemical substances, known as simple or elementary bodies, substantially as described.

2. A series of movable material bodies, varying in size, and marked with numbers, so as to represent the weight of the ultimate particles of matter of different chemical substances known as simple bodies, substantially as and for the purpose set forth.

SAMUEL M. GAINES.

Witnesses:
W. H. BOTTS,
P. H. LESLIE.